Figure 2:
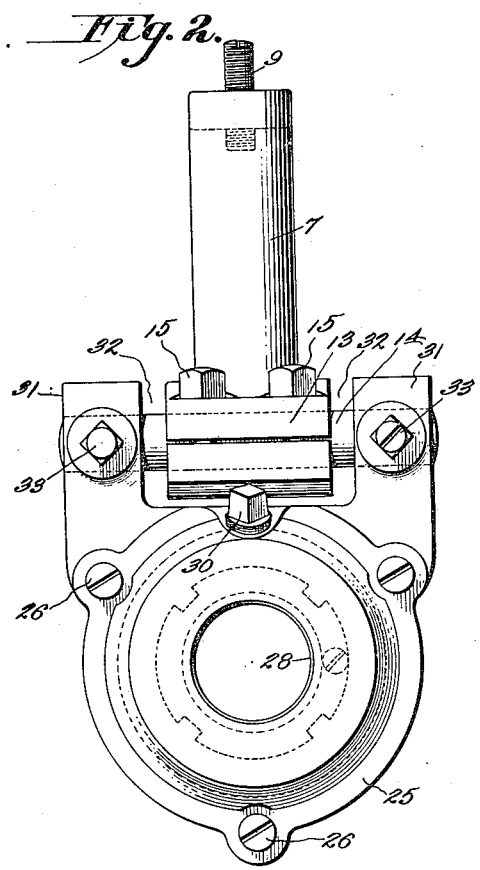

July 10, 1923.
I. F. WEBB
SHAFT HANGER
Filed June 12, 1920 2 Sheets-Sheet 1
1,461,236
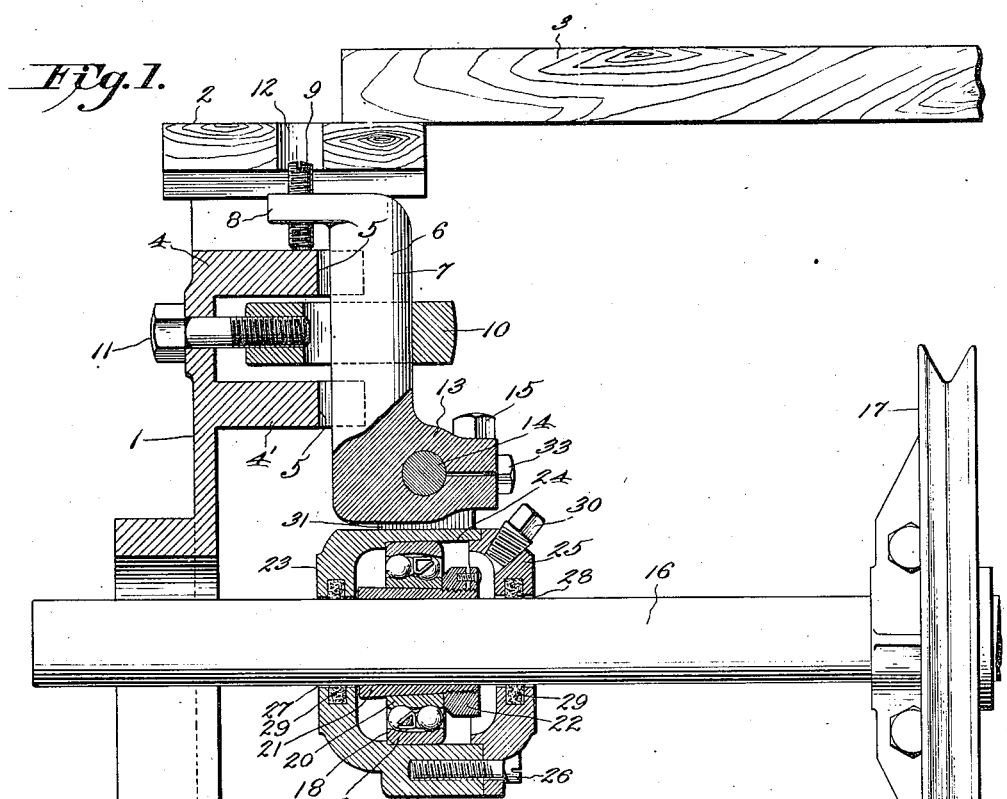
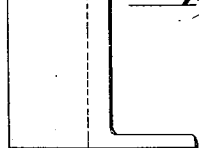
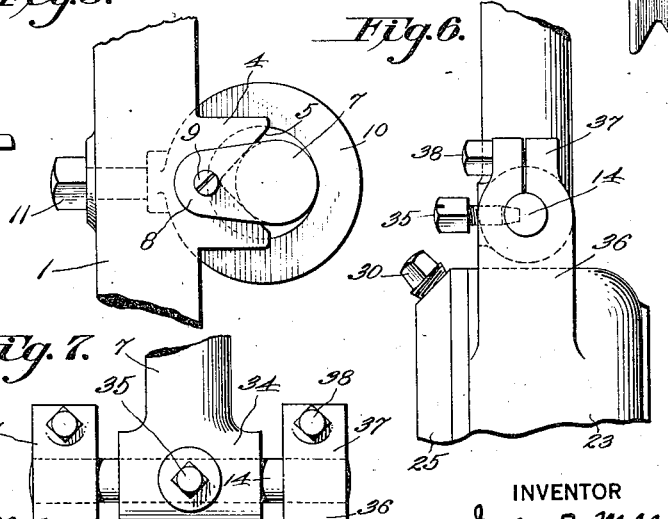
WITNESSES
INVENTOR
BY
ATTORNEY July 10, 1923.

I. F. WEBB

SHAFT HANGER

Filed June 12, 1920

1,461,236

2 Sheets-Sheet 2

WITNESSES:
Godfrey Pecina
Max W. Davis

INVENTOR
Irving F. Webb
BY Henry J. Miller
ATTORNEY

Patented July 10, 1923.

1,461,236

UNITED STATES PATENT OFFICE.

IRVING F. WEBB, OF ELIZABETH, NEW JERSEY, ASSIGNOR TO THE SINGER MANUFACTURING COMPANY, OF ELIZABETH, NEW JERSEY, A CORPORATION OF NEW JERSEY.

SHAFT HANGER.

Application filed June 12, 1920. Serial No. 388,460.

*To all whom it may concern:*

Be it known that I, IRVING F. WEBB, a citizen of the United States, residing at Elizabeth, in the county of Union and State of New Jersey, have invented certain new and useful Improvements in Shaft Hangers, of which the following is a specification, reference being had therein to the accompanying drawings.

This invention relates to shaft-hangers and more especially to a hanger for sustaining ball-bearings for the power-shaft of a sewing machine power-table.

Among the objects of the invention is to provide a bearing support which will allow for adjustment of the bearing in all directions necessary in the proper aligning of the shaft and which after the adjustments are made may be readily and positively secured in adjusted position.

Another object of the invention is to provide a bearing support which is simple in construction, will not readily get out of order, requires very little machining and so is cheap and easy of manufacture and which will not require a great deal of space.

A still further object is to provide a housing for the ball-bearing which will entirely enclose the same, preventing the entrance of dust and dirt thereto and prevent the escape of oil therefrom and still is simple in construction.

These and other objects and advantages of the invention will appear as the description thereof proceeds.

In the preferred embodiment of the invention the ball-bearing, which is of the universal type, is enclosed within a capped housing which also surrounds the shaft. The housing has two upwardly extending spaced lugs or ears which may be disposed on the opposite sides of and spaced from the lower end of a housing support. The housing support and lugs have aligned openings or bearings through which extends a supporting rod and means are provided for securing the rod therein after adjustments longitudinally and axially of the rod have been made.

The housing-support has a vertically extending cylindrical body portion provided with an offset portion extending at right angles thereto at its upper end. The frame of the power-table is provided with two vertically spaced horizontally extending lugs which have V-shaped recesses in their free ends and the cylindrical body portion of the housing-support is adapted to rest in these recesses with the lower end of an adjusting screw extending through the offset portion resting on the upper surface of the upper lug. This cylindrical body portion is clamped in the V-shaped recesses by means of a clamping ring.

Figure 3:
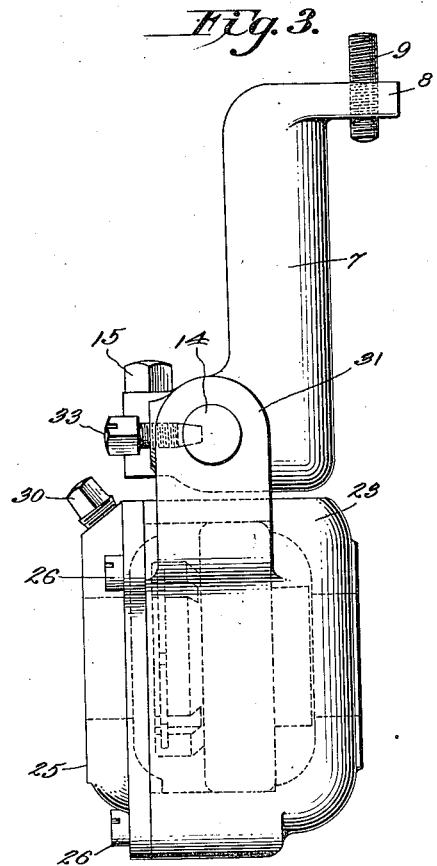
Figure 4:
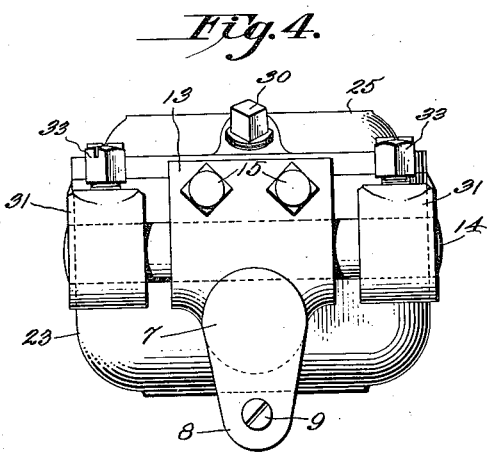

Reference is made to the accompanying drawings for a more detailed description of the invention in which Fig. 1 is a sectional view of a portion of a sewing machine power-table showing my hanger positioned thereon with the end of the shaft, the housing and bearing being shown in section. Fig. 2 is an elevation of the complete hanger detached. Fig 3 is an elevation at right angles to Fig. 2. Fig. 4 is a plan view of the detached hanger. Fig. 5 is a detail plan of the means for securing the housing-support to the power-table frame. Figs. 6 and 7 represent in side and front elevations a slight modification.

Reference numeral 1 indicates a portion of the end of a power-table frame upon which is mounted the top 2 and cover 3 which supports the machine. The frame 1 is provided with two vertically spaced horizontally extending integral lugs 4 and 4' provided in their free ends with alined V-shaped recesses 5.

The hanger proper comprises a housing-support 6 preferably formed with a cylindrical body portion 7 which has integral therewith at its upper end, and extending at right angles to the axis of the body portion, an offset portion 8 through which is threaded an adjusting screw 9 extending substantially parallel with the axis of the body portion. As clearly shown in Fig. 1 the body portion is placed within the recesses 5 and a clamping collar 10 which embraces this body portion extends between the two lugs 4 and 4' and a screw-bolt 11 which is threaded into the collar 10 extends through an opening in the side of the frame 1. By tightening the bolt 11 the support 6 is tightly clamped in position in the recesses 5 as will be obvious. The body portion may be vertically adjusted by the adjusting screw 9, the lower end of which rests upon the upper surface of the upper lug 4. This adjusting screw is accessible for adjustment through an opening 12 in the top 2 of the table. The lower end of the housing-support 6 is provided with a split bearing 13 extending at right angles to the axis of the body portion 7 and mounted in this bearing is a supporting rod 14. The ears of the split bearing are provided with clamping screws 15.

Surrounding the shaft 16 upon which is mounted the pulley 17, for transmitting power to the machine, is the ball-bearing 18. The bearing shown is of the S. K. F. universal type comprising an outer ring 19 having a raceway for the balls and an inner ring 20 provided with a raceway for each set of balls, the whole being clamped to the shaft by means of the split collar 21 and the locking nut 22.

The bearing is enclosed within the housing 23 whose inner wall 24 is of a diameter to fit the outer wall of the ring 19. The housing 23 is open at one side and this open side is closed by a cap 25 secured to the body of the housing by means of suitable screws 26. The openings 27, 28 in the housing body and cap are provided with annular grooves in which are placed packings 29 to prevent entrance of dust and dirt and loss of oil from the bearing. The cap 25 is provided with a removable plug 30 by means of which oil may be supplied to the bearing.

On the upper portion of the housing-body are provided two integral upwardly extending lugs or ears 31, placed at sufficient distance apart that when they embrace the lower split bearing of the housing support 6, spaces 32 are provided, and as the rod 14 extends through these lugs it will be seen that the spaces 32 allow for adjustment of the housing longitudinally of the bearing 13 when the clamping screws 15 are loosened. It will also be noted that as the rod 14 may turn within the bearing 13 the housing 23 has an angular adjustment relative to the housing-support 6. After the adjustments are made the bolts 15 are tightened, clamping the rod 14 in the bearing 13, and as the ears 31 are provided with set-screws 33 the ends of which are recessed into the rod 14, it will be clear that the housing may be securely locked in adjusted position.

By loosening the bolt 11 the housing-support 6 may be adjusted or turned about its axis and may also be adjusted vertically by means of the screw 9. After these adjustments have been made, by tightening the bolt 11 the housing-support is securely clamped to the table-frame 1.

In the modification shown in Figs. 6 and 7 instead of providing the lower end of the housing-support 6 with a split bearing as shown in Figs. 1 to 4, it is provided with a solid bearing 34 having a set-screw 35 therein and the upwardly extending lugs or ears 36 on the housing are provided with split bearings 37 instead of the solid bearings as shown in the other form. The split bearings 37 are provided with clamping screws 38. It will be noted from this arrangement that although the same adjustments may be obtained it is unnecessary to offset the bearing 70 and supporting rod 14 as shown in Figs. 1 and 3, but the axis of this rod may be supported in alinement with the axis of the body portion 7 of the housing-support as shown in Fig. 6. This requires less space lengthwise of the shaft 16, allowing the housing 23 to be placed nearer the end surface of the frame 1.

It will be noted that the structure is a very simple one requiring very little machining and therefore may be manufactured cheaply in large quantities and there are no difficult adjustments to be made. Furthermore the method of mounting the housing on the housing-support and of clamping the housing-support to the frame of the power-table allows for all the adjustments required in properly aligning the shaft.

Having thus set forth the nature of the invention, what I claim herein is—

1. In a device of the class described, a supporting means provided with a lug rigid therewith and having a recess, a support having a portion adapted to rest in said recess, means for clamping said support therein, means independent of the clamping means for adjusting the support in said supporting means, and a bearing secured to the support.

2. In a device of the class described, a supporting means provided with spaced lugs rigid therewith and having aligned recesses, a supporting rod adapted to rest in said recesses, means for adjusting the supporting rod endwise in said recesses, means for clamping the supporting rod against the walls of said recesses in adjusted position, and a shaft bearing secured to the support.

3. In a device of the class described, a supporting means provided with vertically spaced lugs rigid therewith and having aligned recesses, a supporting rod provided with an offset portion, an adjusting screw in said offset portion, means for clamping the supporting rod against the walls of the recesses with the adjusting screw abutting against one of said lugs, and a shaft bearing secured to the support.

4. In a device of the class described, a housing-support comprising a cylindrical body portion, an offset portion at one end, an adjusting screw in said offset portion and the housing-support provided adjacent its opposite end with a transverse bearing, a rod extending therethrough, a support for the housing-support provided with vertically spaced lugs having aligned V-shaped recesses, means for clamping the body-portion in said recesses, a bearing-housing provided with spaced ears on opposite sides of the housing-support through which the rod extends, and means for securing the rod in adjusted position in the housing-support.

5. In a device of the class described, a supporting means formed with an open-sided vertical guideway, a support received in said guideway, a screw for effecting vertical adjustment of said support in said guideway, means independent of said screw for clamping said support to said guideway, and a shaft-hanger carried by and adjustable horizontally on said support.

In testimony whereof, I have signed my name to this specification.

IRVING F. WEBB.